Dec. 31, 1968    A. ZEITLIN ET AL    3,418,923
COMPACT FRAME STRUCTURES
Filed Jan. 3, 1967
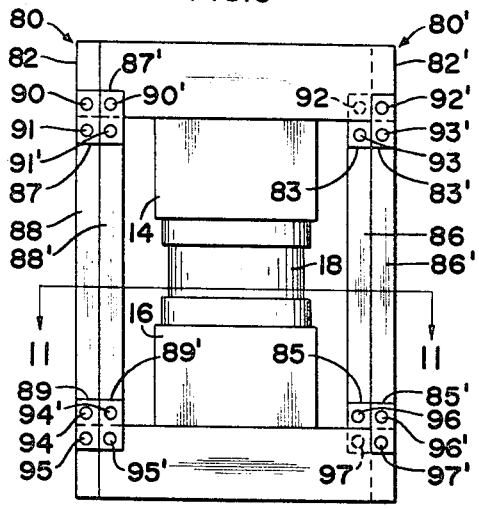
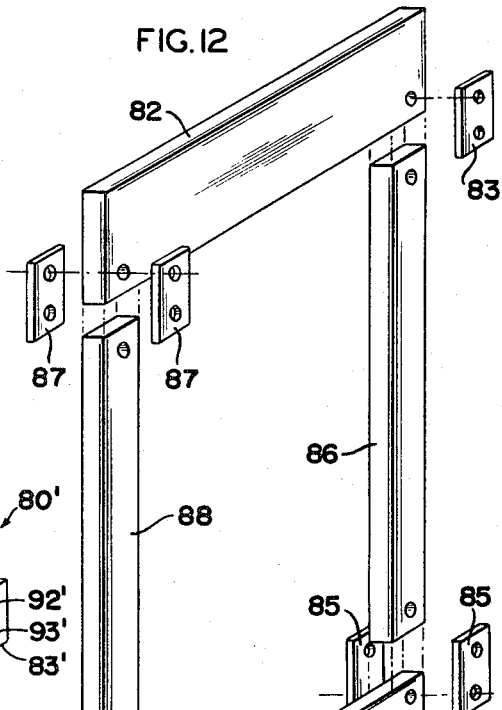
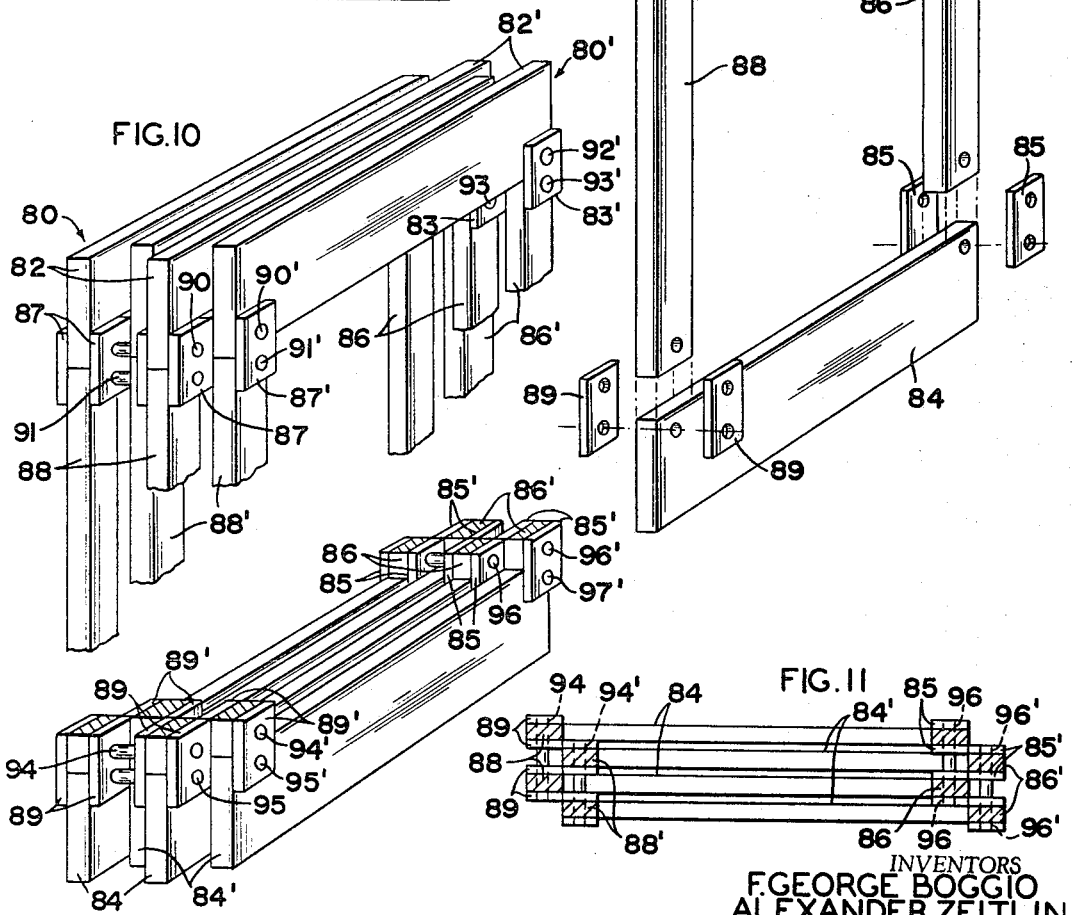
INVENTORS
F. GEORGE BOGGIO
ALEXANDER ZEITLIN
BY Meyer, Tilberry & Body
ATTORNEYS

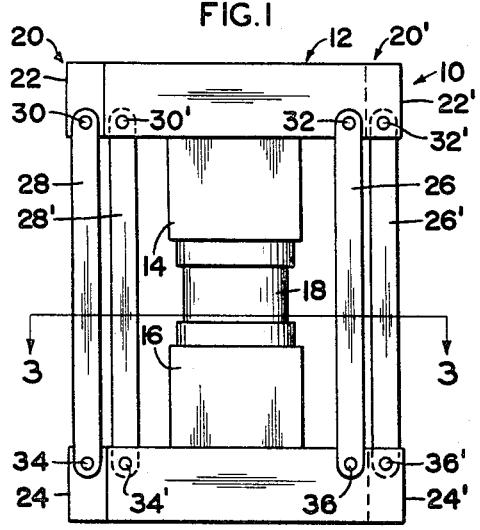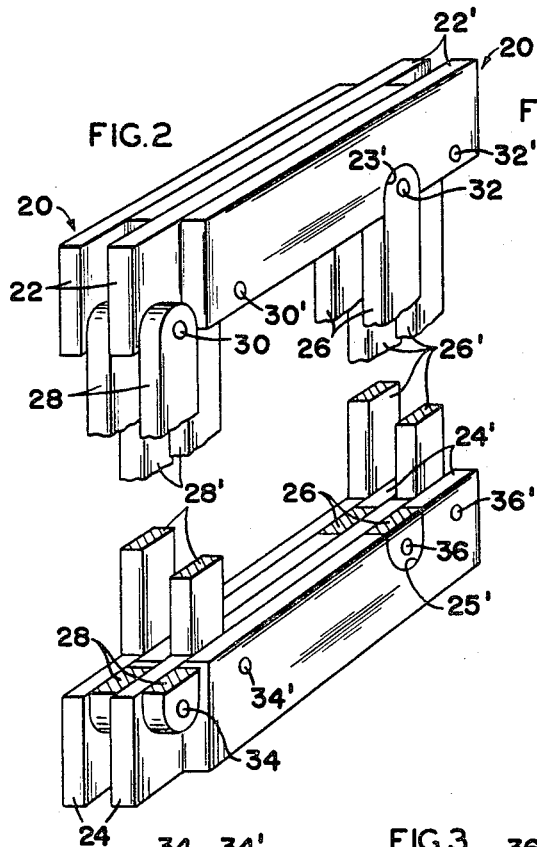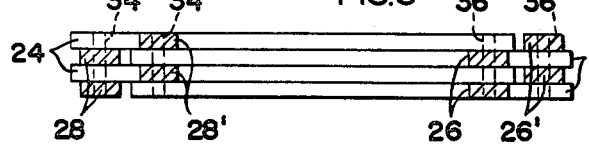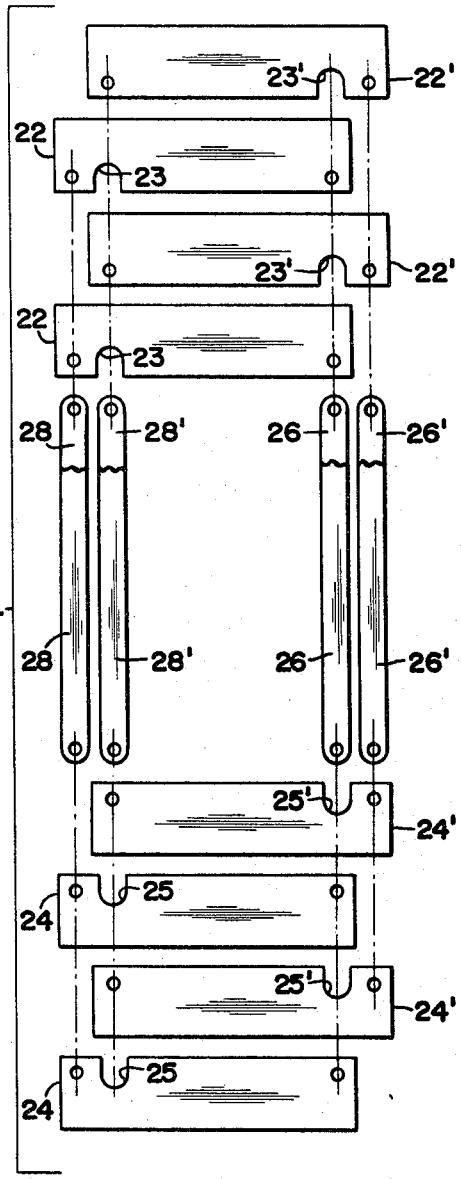
INVENTORS
F. GEORGE BOGGIO
ALEXANDER ZEITLIN
BY Meyer, Tilberry & Body
ATTORNEYS

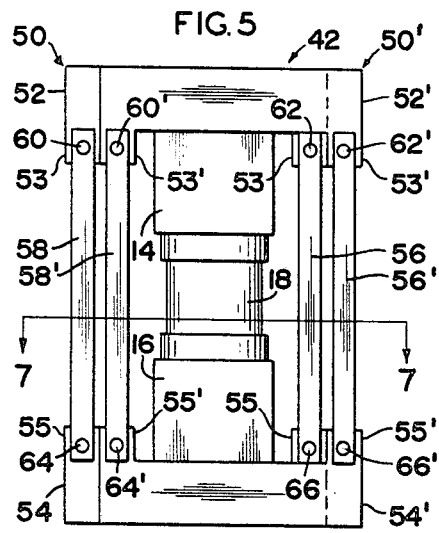
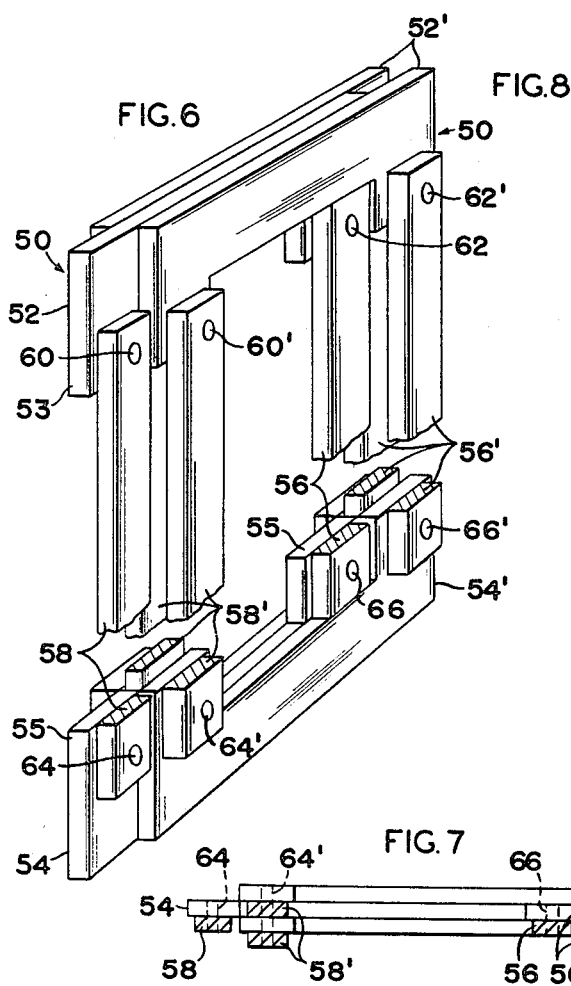
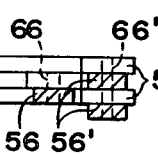
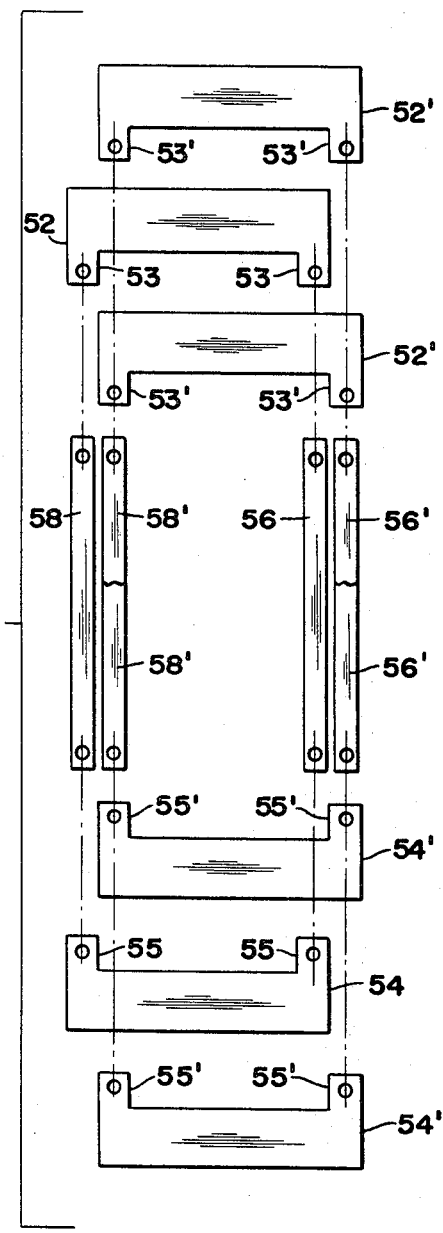

United States Patent Office 3,418,923
Patented Dec. 31, 1968

3,418,923
COMPACT FRAME STRUCTURES
Alexander Zeitlin, White Plains, N.Y., and F George Boggio, Glen Rock, N.J., assignors to Barogenics, Inc., Mount Vernon, N.Y., a corporation of New York
Filed Jan. 3, 1967, Ser. No. 607,052
14 Claims. (Cl. 100—214)

ABSTRACT OF THE DISCLOSURE

Frame structures each comprised of two similar closed polygonal load-bearing frames each disposed around a central space within the structure, the frames each being comprised of spaced beams in parallel planes and forming upper and lower component crossheads and parallel tie means which are connected together by hinge joints. The two frames are arranged so that the beams forming their respective upper and lower component crossheads have the same spatial orientation and are in interleaved and overlapping relationship to form a frame structure with compound crossheads.

---

The present invention is directed to the art of frame structures, and more particularly to an improved frame of the hinge or pin joint type.

The invention is especially applicable for use in apparatus such as forging and extruding presses and will be described with particular reference thereto; however, it is appreciated the invention is capable of broader application and could be utilized in a variety of other apparatus.

In general, hinge or pin type frames are known and generally include a closed rectangular frame having two crossheads each formed of a set or "grating" of parallel cross beams transversely spaced from each other to be separated by voids. The two crossheads are coupled together by two sets of parallel tie beams transversely spaced from each other to be separated by voids, the tie beams being interleaved at their ends with the ends of beams of the crossheads, and a hinge pin being passed through each such interleaving to join the interleaved beams together. Because of the voids between the beams in each crosshead and between the tie beams in each set thereof, the structure requires an undesirably large housing space in comparison to its load bearing capacity.

To the end of improving the ratio of load bearing capacity to required housing space of this type frame structure, it has been proposed to provide a frame means wherein the duplicate single frames are interlinked like two rings. Both of the interlinked frames are vertical and are disposed so that (1) the vertical planes of the two frames intersect at less than a right angle to form an X and (2) the lower crossheads of the two frames are in abutting relation at the center of the X to form a lower compound crosshead and, likewise the upper crossheads of the two frames are in abutting relation at the center of the X to form an upper compound crosshead. Because of their interlinked relation, each of the two frames provides for the compound crossheads one component crosshead which is inside the other frame and one component crosshead which is outside the other frame.

While this type frame structure represents a substantial advance over the prior art and is satisfactory for many applications, it has certain disadvantages as follows. First, because the two frames of the structure are in non-parallel planes, the structure takes up more room than is desirable in the transverse direction i.e. the dimension between the ends closest together of the arms of the X. Also, the X configuration of the structure reduces the dimension of the access way for workpieces (i.e. the dimension between the ends farthest apart of the arms of the X) to a size less than the horizontal span of the crossheads of the frame.

Second, the inner and outer component crossheads of each compound crosshead are in series with each other for the purpose of receiving and absorbing the load imposed on the compound crosshead. Because of the serial coupling of the two component crossheads of each compound crosshead, the two frames are locked together under load so as to be unable to each respond to the load in the manner which is unconstrained by contact with the other frame. Further, because the load is transmitted to each outer component crosshead through the inner component crosshead the deformation patterns of the two component crossheads are not necessarily the same, and the inner crosshead is subjected to an outward loading force which is about twice that on the outer crosshead.

Third, the compound crossheads of the frame structure each provide a fill factor of only 50% for a load applied to the crosshead. That 50% figure is arrived at as follows. First, a determination is made for the beams of the compound crosshead of the effective areas of the innerface portions of those beams to which portions of the outward load stress are transmitted by wholly parallel couplings of the load to the tie-connected beams of the compound crosshead. By "effective area" is meant the component of the full area of any such face portion which is normal to the direction of application of the load. The total of such effective areas is then divided by the area of the whole circumscribed region occupied by those effective areas to yield the fill factor.

A fill factor of 50% is obtained for the compound crossheads of the frame structure because, in each of those compound crossheads it is only the beams of the inner component crossheads which provide inwardly facing beam portions to which portions of the outward load stress are transmitted by wholly parallel couplings of the load to the tie-connected beams of the compound crossheads.

Further, the compound crossheads of the structure cannot, practically speaking, be distributively loaded from one side to the other of the central working space enclosed by the frame structure of that patent. That is so because the load on each such compound crosshead should be distributed only over the region theerof within which there is an overlapping of the component crossheads of the compound crossheads and the size of that region varies directly with the respective extent from their transverse directions of the two component crossheads. If, however, those transverse extents are increased to increase the size of that region, when the access way for workpieces is commensurately reduced in size. It follows that, if the transverse extents of the component crossheads are increased enough to create such a region extending fully from side to side of the central space of the frame structure, there would be no access way at all for workpieces.

In order to overcome the problems inherent in the structure shown in U.S. Patent 3,278,993, the commonly assigned copending application Ser. No. 606,920, filed Jan. 3, 1967 entitled "Load Bearing Frame Structures" of Ruloff F. Kip, Jr., provides a frame structure which is comprised of at least two closed polygonal load bearing frames each disposed around a central space within the structure and each comprised of (a) outwardly extending crossheads on longitudinally opposite sides of the space and (b) longitudinally extending tie means disposed on laterally opposite sides of such space to couple together the crossheads of that frame. The two frames are disposed in relation to each other to have respective lateral-longitudinal mid-planes normal to a common line in the transverse direction and to be characterized on each of the laterally opposite sides of said space by an overlapping in the transverse direction of the respective transverse extents of the two frames.

When the frame is formed in this manner, the housing space required in the transverse direction is materially reduced over what is required by the above discussed frame. Additionally, a frame formed in this manner maximizes the ratio of the load capacity to the housing space required and permits frame structures having fill factors in excess of 50%.

As is apparent, this frame structure offers substantial advantages over the previously discussed frame; however, certain problems are inherent with this structure. For example, generally when a frame structure is formed in this manner either one or both of the tie means and the component crossheads are inclined relative to the line of action of the pressing apparatus carried by the frame. Although, in stationary frame presses inclined tie means present no problem, in those presses wherein the frame moves vertically during the pressing operation and must be guided some problems are encountered. Because the tie means are inclined, they cannot be used as guide surfaces and the frame structure must be provided with additional guiding elements. This tends to complicate the frame structure and of course increases its cost. Additionally, if the component crossheads are inclined, the longitudinal extent of the frame is as great as that of the previously discussed frame. Thus, the height of the housing structure must correspondingly be as large as previously required. The inclining of the component crossheads presents an additional problem in that special provisions must be made to permit the press rams to be properly mounted.

The present invention provides a frame structure which permits the advantages accruing to frames formed in accordance with the aforesaid Kip application to be obtained, and additionally, overcomes the problems of inclined component crossheads and tie means.

In accordance with the present invention a frame structure is provided which is comprised of at least two closed polygonal load bearing frames each disposed around a central space within the structure and each comprised of laterally extending component crossheads on longitudinally opposite sides of such space and longitudinally extending tie means disposed on laterally opposite sides of said space to couple together the outer end portions of the component crossheads of that frame. The two closed polygonal load bearing frames thus formed are arranged so that their respective component crossheads have the same spatial orientation and form a compound crosshead wherein at least one of the end portions of each component crosshead is in overlapping relationship with the next adjacent component crosshead in a direction transverse to the tie means.

In this manner, the problems of inclined component crossheads and tie means are eliminated and a frame structure having a high load carrying capacity relative to its required housing space is provided.

A primary object of the present invention is the provision of a frame structure which requires a minimum of housing space.

An additional object is the provision of a frame structure having composite crossheads which have the same spatial orientation.

A further object is the provision of a frame structure which can be fabricated from simple commercially available beam members and hinge pins.

These and other objects and advantages will become apparent from the description used to illustrate preferred embodiments of the invention as read in connection with the accompanying drawings in which:

FIGURE 1 is an elevational view of a press having a frame structure constructed in accordance with the present invention;

FIGURE 2 is a pictorial view of the frame structure shown in FIGURE 1 with certain portions broken away to more clearly show the details of construction;

FIGURE 3 is a cross-sectional view taken on line 3—3 of FIGURE 1;

FIGURE 4 is an exploded view of the frame structure of FIGURE 1;

FIGURE 5 is an elevational view of a press having a frame structure formed in accordance with a second embodiment of the present invention;

FIGURE 6 is a pictorial view of the frame structure of FIGURE 5 with portions broken away to more clearly show the details of construction;

FIGURE 7 is a cross-sectional view taken on line 7—7 of FIGURE 5;

FIGURE 8 is an exploded view of the press frame structure of FIGURE 5;

FIGURE 9 is an elevational view of a press having a frame structure formed in accordance with a third embodiment of the present invention;

FIGURE 10 is a pictorial view of the frame structure shown in FIGURE 9;

FIGURE 11 is a cross-sectional view taken on line 11—11 of FIGURE 9; and,

FIGURE 12 is an exploded pictorial view of one of the frame elements of the frame structure of FIGURE 9.

In the following discussion any elements which are counter-parts will be designated by the same reference numerals but differentiated from each other by use of a prime suffix for the reference numeral designating those elements. Unless the context otherwise requires, a description of any element is to be considered as being equally applicable to its counterpart.

Referring now to the drawings wherein the showings are for the purpose of illustrating preferred embodiments of the invention only and not for the purpose of limiting same FIGURE 1 shows the overall arrangement of a press 10 having a frame structure 12 formed in accordance with the present invention and carrying a pair of opposed rams 14 and 16 for doing work on a piece of work 18 such as a billet. Either one or both of rams 14 and 16 could be actuated in any convenient manner, for example, hydraulically or mechanically.

An important aspect of the present invention is the overall arrangement of frame structure 12. As best shown in FIGURES 1 and 2 frame structure 12 is comprised of two independent frames 20 and 20' of which each is in the form of a rectangle and of which each is disposed around a central space within the structure 12. The two rectangular frames are duplicates in size and shape but have opposite orientation, i.e., have a mirror image relation to each other in the sense that the frame 20 is identical to frame 20' rotated 180° about a vertical axis. Because of the identity of configuration of the two frames, only frame 20 will be described in detail.

Frame 20 is comprised of a pair of upper crosshead forming beam members 22 which are positioned in parallel relationship and transversely spaced from one another so as to have a void therebetween of the same thickness as the members to provide an upper component crosshead. A lower component crosshead is similarly arranged and comprises a pair of parallelly positioned crosshead forming beam members 24 which are likewise transversely spaced so as to provide a void between them of the same thickness as the members. As can best be seen in FIGURE 2 the crosshead forming beam members 22 are positioned in the same pair of vertical planes as beam members 24.

The outer end portions of each of the upper crosshead forming beam members 22 are connected in parallel with the outer end portions of each of the lower crosshead forming beam members 24 by pairs of right-hand and left-hand tie means 26 and 28. These tie means are comprised of steel beams of a thickness approximately equal to the transverse spacing between the crosshead forming beam members. As best shown in FIGURES 2 and 3, the end portions of the tie means 26 and 28 are in interleaving and overlapping relationship with the end portions of the upper and lower crosshead forming beam members 22 and 24. Hinge pins 30, 32, 34 and 36 are passed through the four resulting interleavings to provide low transmissive couplings in the form of hinge joints by which the crosshead forming beam members and the tie means are coupled together to form the closed load bearing rectangular frame 20. The advantages provided by hinge joints of this type are set out in U.S. Patent 2,968,837 to Zeitlin et al.

As shown in FIGURE 3 and as described above, each of the hinge pins preferably passes through both of the crosshead forming beam members and both of the tie means at each corner of the frame. However, it is within the scope of the present invention to utilize two separate hinge pins at each corner to join only one tie means and one crosshead forming beam member of each interleaved and overlapping group to thereby have frame 20 constituted of two independent frames. In such case, the two independent frames forming frame 20 could be maintained in their proper relationship to one another by a loosely fitting housing or light supporting framework.

Frame structure 20' is, as previously mentioned, a mirror image duplicate of frame structure 20. As shown in FIGURES 2 and 3, frame 20' is positioned so that its upper and lower crosshead forming beam members 22' and 24' are in interleaving and overlapping relationship with the corresponding upper and lower crosshead forming beam members 22 and 24 of frame 20, but laterally offset relative thereto. Thus, the component crossheads of each of frames 20 and 20' are interrelated to provide compound upper and lower crossheads with a fill factor of 100% for frame structure 12.

In order to permit the component crossheads of both frame 20 and 20' to have the same spatial orientation and eliminate the need of inclined component crossheads or non-parallel tie means as required by the frame structure disclosed in the copending commonly assigned application to Ruloff F. Kip, Jr., each of the upper crosshead forming beam members 22 are provided with a tie means receiving opening 23, while the upper crosshead forming beam members 22' are provided with a similar tie means receiving opening 23'. Similarly, the lower crosshead forming beam members 24 and 24' are provided with openings 25 and 25'. These openings permit the ends of the tie means associated with each of the frames 20 and 20' to be freely received in the other frame and allows the crosshead forming members to have the same spatial orientation without the necessity of any positive coupling between frame 20 and frame 20'.

This lack of coupling between frames 20 and 20' is an advantage because coupling would have the effect in the longitudinal and lateral directions of causing a deformation of one of the frames or an adjustment of one of the frames in its shape or in its position (angular or translational) to be wholly or partly constrained by the other frame. Hence, in the longitudinal and lateral directions the two frames are in floating relation to each other.

By having the end portions of each of the crosshead forming members of each of the frames in overlapping and interleaving relationship with the crosshead forming members of the other frame, a frame structure is provided which has substantially all of the advantages described with reference to the frame structure disclosed in the copending common assigned application to Ruloff F. Kip, Jr. and additionally permits the tie means to extend vertically parallel to provide guiding surfaces when the frame is intended for use in a moving frame type press such as shown in U.S. Patent 3,278,993. Further, the overall height of a frame having the same strength and longitudinal open space is substantially less than that obtainable by use of the structure described in the aforementioned Kip application.

Although it is apparent that by providing the tie means receiving openings in the crosshead forming members, a certain degree of strength is sacrificed, this loss in strength is not particularly important when the loads imposed on the crosshead members are considered. As can be readily visualized from FIGURE 1, with the rams acting inwardly against the workpiece the outwardly directed reaction forces which act against the crossheads produce bending moments in the crosshead members. These bending moments are at a maximum at the central portion of the crossheads and decrease to zero at the pin connections to the tie members. Thus, the bending moment imposed on the cut-away section of the crosshead forming member is not as great as that imposed on the central portion of the member and consequently, the strength needed at that location is substantially less. Thus, the small strength loss is of no material importance and is more than outweighed by the advantages gained.

The frame structure 42 utilized in the press structure shown in FIGURE 5 is basically the same as that previously described with reference to FIGURES 1–4. As best shown in FIGURES 5 and 6 the frame structure 42 is comprised of two rectangular independent frames 50 and 50'. Frame 50 comprises a single upper crosshead forming beam member 52 and a single lower crosshead forming beam member 54. The outer end portions of the two crosshead forming members are connected in parallel through tie means 56 and 58 by pins 60, 62, 64 and 66. Although frame 50 is shown as having each of its component crossheads comprised of only a single set of upper and lower crosshead forming members, it could obviously have any number arranged in spaced relationship in the manner previously described with regard to the embodiment of FIGURE 1.

Frame 50', as shown, is comprised of a pair of upper crosshead forming beam members 52' and a pair of lower crosshead forming beam members 54'. Members 52' lie in the same vertical plane as members 54' and are spaced to provide a void therebetween of the thickness of the members. The outer end portions of the members are connected in parallel by tie means 56' and 58' and pins 60', 62', 64' and 66'.

The crosshead forming beam members of frame 50 and frame 50' are in interleaving and overlapping relationship in the same manner as the corresponding members of the frame structure of FIGURE 1.

Of importance to the embodiment of FIGURE 5 is the arrangement utilized for providing the connection between the crosshead forming beam members and their respective tie means. In order to permit the component crossheads of frames 50 and 50' to have the same spatial orientation and produce a compound crosshead having a fill factor of 100%, without the necessity of providing cut-away portions in the crosshead forming beam members as provided in the frame structure of FIGURE 1, the upper crosshead forming beam members 52 are provided with depending connection portions 53 formed on their outer end portions. The lower crosshead forming beam members 54 are likewise provided with connection portions 55 which extend upwardly from their outer end portions. In this manner, a frame structure is provided which has all the advantages of the frame structure of the embodiment of FIGURE 1, without having the weakened portions caused by the tie means receiving openings.

The frame structure utilized in the press shown in FIGURE 9 is constructed on the same general principles as the two previously described frame structures. This frame, like the other two, is comprised of two relatively independent rectangular frames 80 and 80'. As seen in FIGURE 10, frame 80 is comprised of a pair of spaced upper crosshead forming beam members 82, and a pair of spaced lower crosshead forming beam members 84 which are positioned in the same respective vertical planes as the upper crosshead forming members. The outer end portions of the upper and lower crosshead forming members are connected in parallel by tie means 86 and 88.

The upper and lower crosshead forming beam members of frame 80 are in interleaving and overlapping relationship with the corresponding crosshead forming beam members of frame 82' in much the same manner as the corresponding members of the two previously described embodiments. However, because of the means used to connect the tie means to the crosshead forming beam members, the beam members are not in contacting relationship and the resulting frame structure does not have a fill factor of 100% as do the two previously described frame structures. However, this structure does yield a fill factor of 66⅔% and is a substantial improvement over the prior art frame structures which yield only a 50% fill factor.

As best shown in FIGURES 10 and 12 the tie means 86 and 88 are joined to the outer end portions of the crosshead forming beam members 82 and 84 by the use of tie plates 83, 85, 87 and 89, and hinge pins 91–97. The tie plates are rectangular steel plates of a thickness approximately ½ that of the crosshead forming beam members and the tie means.

As shown, one tie plate is positioned on each side of each of the joints between each crosshead forming beam member and its corresponding tie means. The hinge pins are then passed transversely through both sets of tie means and crosshead forming beam members to tie them into a unitary structure.

Additionally, as can be seen from FIGURES 9 and 10, the pins 92 and 97, and 90' and 95', in addition to passing through the tie plates and beam members of their respective frames 80 and 80', also pass through the beam members of the opposite frame which are intermediate the beam members of their frame. This provides an interlocking of the frames 80 and 80'.

Alternately, it would, of course, be possible to terminate pins 92, 97, 90' and 95' on each side of the intermediate beam members so that the two frames are not interlocked, but rather are in floating relationship to one another.

As can be seen from the foregoing descriptions of the preferred embodiments of the present invention, an extremely advantageous frame structure has been provided which overcomes the problems previously encountered in hinge pin type frames.

The invention has been described in great detail sufficient to enable one of ordinary skill in the frame art to make and use the same. Obviously modifications and alterations will occur to others upon a reading and understanding of the invention and it is our intention to include all such modifications and alterations insofar as they come within the scope of the appended claims.

Having thus described our invention, we claim:

1. In a frame structure comprised of at least two closed polygonal load-bearing frames each disposed around a central space within said structure; each frame comprised of laterally extending crossheads on longitudinally opposite sides of said space terminating in end portions, and of separate longitudinally extending tie means disposed on laterally opposite sides of said space and coupled with the end portions of such crossheads by load-transmissive couplings productive of an opposed reaction in said tie means between respective outward loads on said crossheads; said frame structure having compound crossheads disposed on longitudinally opposite sides of said space and each comprised of component crossheads of which each component crosshead is a crosshead of a respective one of said frames; the improvement comprising: said component crossheads of at least one of said compound crossheads having the same spatial orientation and at least one of said end portions of each of said component crossheads of said one compound crosshead being in overlapping relationship with the next adjacent component crosshead in a direction transverse to said tie means.

2. The improvement as defined in claim 1 wherein each of said component crossheads of said one compound crosshead is comprised of transversely spaced beams separated by voids and disposed in transversely displaced relation with the respective beams of the other component crosshead of said one compound crosshead.

3. The improvement as defined in claim 1 wherein each of said two closed polygonal load bearing frames are rectangular.

4. The improvement as defined in claim 1 wherein the component crossheads of each compound crosshead are in substantially contacting relationship.

5. The improvement as defined in claim 1 wherein each of said component crossheads is comprised of transversely spaced beams separated by voids and disposed in transversely displaced relation with the respective beams of the other component crosshead of its respective compound crosshead.

6. The improvement as defined in claim 1 wherein all of said component crossheads and all of said tie means of each of said frames are comprised of transversely spaced beams positioned in parallel planes, and wherein said tie means are joined to said component crossheads by hinge pin connections.

7. The improvement as defined in claim 1 wherein each of said frames is rectangular and of the same size.

8. The improvement as defined in claim 1 wherein each component crosshead is comprised of spaced beams, and wherein the beams of each component crosshead are in interleaving and overlapping relationship with the beams of the other component crosshead of its respective compound crosshead.

9. The improvement as defined in claim 8 wherein said tie means comprise beams in interleaving and overlapping relationship with the beams of the component crosshead of their respective frame.

10. The improvement as defined in claim 9 wherein said beams of the tie means are connected to the beams of the component crossheads by hinge pins.

11. The improvement as defined in claim 10 wherein the beams of each of the component crossheads are provided with openings which loosely receive the beams forming the tie means for the other frame.

12. The improvement as defined in claim 11 wherein each of the beams forming the component crossheads are provided with portions joined to their end portions and extending inwardly toward said central space for connection to said tie means.

13. The improvement as defined in claim 8 wherein said beams of each of said component crossheads are in contacting relationship with the beams of the other component crosshead of their respective frame to thereby produce compound crossheads having a fill factor of 100%.

14. The improvement as defined in claim 8 wherein the tie means comprise beams joined to the beams of the component crossheads of their respective frame by tie plates and hinge pins.

References Cited

UNITED STATES PATENTS

| | | | |
|---|---|---|---|
| 2,416,058 | 2/1947 | Mangnall | 100—214 XR |
| 2,722,174 | 11/1955 | Albers | 100—214 XR |
| 2,968,837 | 1/1961 | Zeitlin et al. | 100—214 XR |
| 3,278,993 | 10/1966 | Brayman et al. | 100—214 XR |

FOREIGN PATENTS

| | | |
|---|---|---|
| 1,401,193 | 4/1965 | France. |
| 719,403 | 4/1942 | Germany. |
| 15,222 | 7/1904 | Great Britain. |
| 301,779 | 12/1928 | Great Britain. |
| 644,980 | 10/1950 | Great Britain. |

BILLY J. WILHITE, *Primary Examiner.*

U.S. Cl. X.R.

100—264; 72—455